Dec. 31, 1929.  C. B. McKENNA  1,741,198

VALVE

Filed Nov. 2, 1927

INVENTOR.
Charles B. McKenna
BY
ATTORNEY

Patented Dec. 31, 1929

1,741,198

UNITED STATES PATENT OFFICE

CHARLES B. McKENNA, OF NEW YORK, N. Y.

VALVE

Application filed November 2, 1927. Serial No. 230,446.

This invention relates to a valve and has more particular reference to a valve for a pneumatic tire having for one of its objects the provision of means for preventing over-inflation of the pneumatic tire.

Another object of my invention is the provision of a valve for pneumatic tires comprising a relief valve for preventing inflation thereof above a predetermined pressure, which may be adjusted to vary the predetermined pressure at which actuation of the relief valve takes place.

A further object of my invention is the provision of an inlet valve having a safety valve therein for allowing discharge of air when a predetermined pressure is exceeded while inflating a tire which may be rendered inoperative after inflation by screwing a cap thereon to prevent escapement of air from the tire while in use due to temperature changes and temporary increases in pressure caused by engagement of the tire with irregularities.

A still further object of my invention is the provision of means for rendering a safety valve of an inlet valve of a tire inoperative after the inflation of a tire which may be manipulated for deflating the tire when desired.

Other objects will appear hereinafter the novel features and combinations being more clearly set forth in the appended claim.

Figure 1:
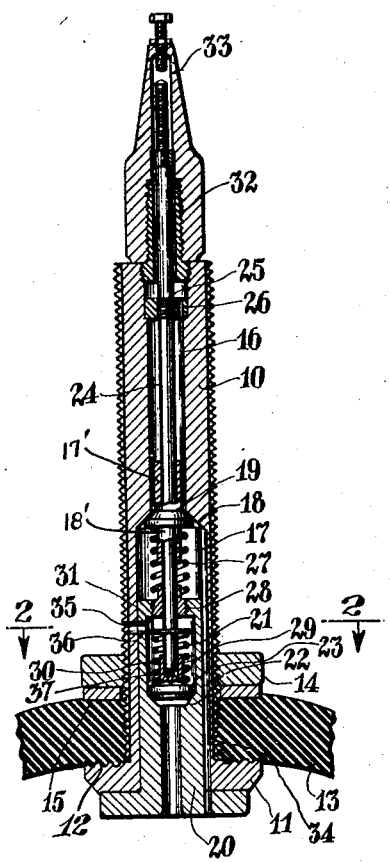
Fig. 1 is a longitudinal sectional view of a pneumatic tire valve.

Referring particularly to the drawings, the valve comprises an outer casing 10 having a flange 11 on the inner end thereof, which is adapted to be disposed within a tire tube illustrated at 13. Grooves 12 are formed on the flange 11 for facilitating gripping of the inner surface of the tire tube. A nut 14 is screw threaded on the outer casing 10 above a washer 15 which is adapted to be urged downwardly by the nut 14 for clamping the casing 10 on a tire tube.

The casing 10 is hollow throughout its length, being provided with an outer bore 16 of smaller diameter than an inner bore 17. There is a beveled shoulder 18 between the junction of these two bores which provides a valve seat for the inlet valve 19, hereinafter more clearly set forth, which prevents escapement of air from the tire tube through the outer extremity of the casing 10. There is a tubular member 20 having a cylindrical passage therethrough comprising an enlarged bore 21 disposed in the inner recess 17 of the outer casing 10. An inclined shoulder 22 within the tubular cylindrical member provides a valve seat for a relief valve 23 hereinafter more clearly set forth.

The passage in the cylindrical member 20 communicates with the interior of the tire tube 13.

Figure 2:
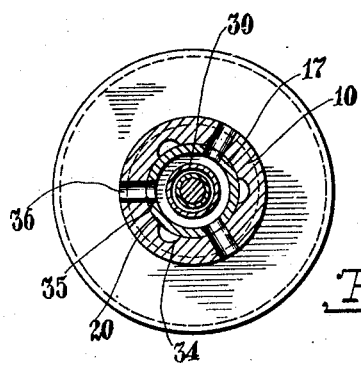
Fig. 2 is a transverse sectional view taken on the line 2—2 of Fig. 1.

A hollow tubular rod 24 is disposed longitudinally through the casing 10 and extends thereabove as illustrated in Figs. 2 and 4. The rod 24 is threaded at 25 in an internally screw threaded member 26 mounted in the casing 10 near the upper extremity thereof. A spring 27 is disposed around the rod 24 between the lower side of the inlet valve 19 and a plug member 28 is threaded in the outer end of the cylindrical member 20 into which the rod 24 extends through an aperture in the plug 28. It should be understood that the inlet valve 19 is slidably mounted on the rod 24 and that the spring 27 normally urges the valve outwardly against the valve seat 18. The valve member 19 comprises upwardly and downwardly extending sleeves 17' and 18', respectively, which are formed to closely fit the surface of the rod 24 for preventing the escapement of air between the rod 24 and the aperture in the valve 19 through which the rod 24 extends. The spring 27 is helical in shape and surrounds at its upper portion the sleeve 18' and surrounds the rod 24 throughout the remainder of its length. The spring 27 is confined between the valve 19 and a plug 28 in the upper extremity of the tubular member 20. The plug 28 is provided with an aperture through which the rod 24 passes. There is a sufficiently tight fitting relation between the sides of aperture in the plug 28 and the rod 24 to prevent leakage of air from the space above the plug to the space therebelow. The inner end of the rod 24 extends into socket 29 rigidly attached to the relief valve 23 and a spring 30 is disposed around the socket 29 and against the relief valve 23 for normally urging the latter against the seat 22 to prevent air from within the tire 13 from being exhausted through the cylindrical member 20. A washer 31 is rigidly attached to the rod 24 and is positioned within the member 20 adjacent the outer end of the relief valve spring 30. It should be understood that adjustment of the relief valve spring may be affected by rotation of the rod 24 relative to the threaded member 26 in which it is mounted for varying the position of the washer 31. When the rod 24 is screwed inwardly the spring 30 is tensioned and when the rod is screwed outwardly the tension of the spring 30 is reduced.

A nipple 32 is threadedly attached to the outer extremity of the casing 10 and is provided with external screw threads for receiving the discharge end of a hose coupling, not shown in the accompanying drawings, for effecting inflation of the tire tube 13. It should be understood that after inflation of the tire and during use thereof, a cap 33 may be screw threaded on the nipples 32 for closing the entrance to the casing as illustrated in Fig. 1. Passages 34 are provided in the cylindrical member 20 for permitting air to pass from the outer bore 16 through the larger bore 17 and into the tire 13. It should be understood that an aperture 35 in the outer casing 10 registers with an aperture 36 in the side of the cylindrical member 20 which is disposed in advance of the relief valve 23.

When air is introduced into the tire 13 it is restrained from outward passage through the passage in the member 20 by the relief valve 23 and spring 30, but when a predetermined pressure is exceeded, the relief valve 23 is lifted permitting the air introduced in the tire 13 to be exhausted through the registering apertures 36 and 35 in the member 20 and casing 10 respectively.

Figure 3:
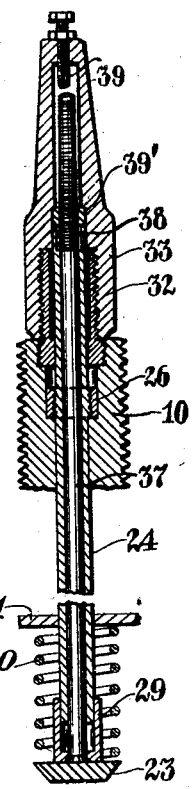
Fig. 3 is a fragmentary enlarged sectional view of part of the construction illustrated in Fig. 1.

The tubular rod 24 is provided with an inner solid rod or stem 37 which is attached to the socket 29 mounted on the relief valve 23. The solid rod 37 extends beyond the outer extremity of the tubular member 24 and is screw threaded as at 38 at its outer portion. A nut 39' is threaded on the threaded outer end portion 38 of the rod 37 as illustrated in Fig. 3. The rod 37 extends sufficiently in advance of the end of the tubular member 24 and the nipple 32 so as to engage the inner end of a set bolt 39 in the top of the cap 33 for a purpose hereinafter set forth.

It should be understood that during inflation of the tire it is desirable to have the safety valve 23 in operative relation to the inflation valve of a tire, but when the tire is in use it is not always essential or advantageous to have the safety valve 23 in operative condition. If the safety valve 23 is retained in operative condition during use of a tire and after inflation thereof it would permit escapement of air from the tire each time the pressure therein was temporarily increased by engagement of a tire with an irregularity or bump in a road and when the temperature changed. This condition would be very unsatisfactory and for that reason the rod 37 is provided of sufficient length to engage the end of the set bolt 39 which is adjustably screw threaded in the extremity of the cap 33 so as to retain the valve 23 on its seat during use of the tire after inflation thereof when the cap is positioned as illustrated in Fig. 1.

It should be also understood that the rod 37 may be pulled outwardly by tightening the screw 38 or screwing the same downwardly against the extremity of the tubular member 24 for lifting the valve 23 from its seat to exhaust the air from the tire when desired.

It should also be understood that the set bolt 39 may be adjusted to permit the relief valve 23 to remain in inoperative condition after inflation of the tire while the cap 33 is in place on the casing 10.

Obviously those skilled in the art may make various changes in the details and arrangement of parts without departing from the spirit and scope of my invention as defined by the claim hereto appended.

Having thus fully shown and described an embodiment of my invention what is desired to be secured by Letters Patent of the United States is:

A release valve for inflated tires comprising a casing, a chamber in said casing, a passageway from said chamber to the inner end of the casing, a second passageway from said chamber through the side of the casing, a valve seat in said chamber, a valve member adapted to fit in said seat, a sleeve slidable in said casing and having a collar thereon adjacent to said valve member, an extension on said valve member slidable on said sleeve, a spring interposed between said collar and valve member to normally hold the valve member in closed position, said spring being adapted to yield when the pressure on the valve member exceeds a predetermined amount, means in said casing engaging said sleeve for adjusting the same longitudinally to vary the tension of the spring, a rod slidable in said sleeve and connected to said valve member, said rod extending beyond the outer end of the casing, an air-tight cap member adapted to be secured to the outer end of the casing and an adjustable screw in the top of said cap to engage said rod to lock the valve member in closed position.

In testimony whereof I have affixed my signature.

CHARLES B. McKENNA.